United States Patent Office 3,544,351
Patented Dec. 1, 1970

---

3,544,351
METHOD FOR COATING AN ARTICLE WITH AN OXYMETHYLENE POLYMER AND PRODUCT THEREOF
George C. Schweiker, Mountainside, and Harry W. Tenney, Jr., West Long Branch, N.J., and Robert L. Patrick, Palos Park, Ill., assignors to Celanese Corporation, New York, N.Y., a corporation of Delaware
No Drawing. Continuation of application Ser. No. 386,398, July 30, 1964. This application Sept. 30, 1968, Ser. No. 766,372
Int. Cl. B44d 1/092, 1/095; C23I 7/00
U.S. Cl. 117—21    15 Claims

---

ABSTRACT OF THE DISCLOSURE

A method of coating objects with oxymethylene polymers wherein the object to be coated is first treated with a base or primer material which, upon partial decomposition, results in an oxymethylene polymer-receptive surface, the thus-primed article is heated to partially decompose said base, and the oxymethylene polymer is then applied by such techniques as fluidized bed coating or powder spraying.

---

This application is a streamline continuation of parent application Ser. No. 386,398, filed on July 30, 1964, now abandoned.

The present invention relates broadly to the coating art, and is more particularly concerned with a novel method of coating articles with oxymethylene polymer compositions.

When an object made of either a metallic or nonmetallic material is coated directly with an oxymethylene polymer by powder spraying or by a process known as fluidized bed coating, it has been found, on many occasions, that it is difficult to get adequate adherence between the polymer coating and the object which is being coated. Importantly, in the subject invention it has been found that if the object to be coated is pre-treated with a suitable base or primer material which, upon partial decomposition, results in a polymer-receptive surface, tightly adherent film or coating of oxymethylene polymer is obtained thereon by the use of fluidized bed or powder spraying or related techniques.

Oxymethylene polymers, having recurring —OCH$_2$— units directly attached to each other, have long been known. Such polymers may be prepared by the polymerization of formaldehyde or trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention, the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

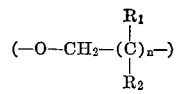

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

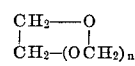

where $n$ is an integer from zero to 2.

Examples of preferred polymers include copolymers of trioxane and cyclic ethers containing at least two adjacent carbon atoms such as the copolymers disclosed in U.S. Pat. No. 3,027,352 to Walling et al. which patent is assigned to the same assignee as the subject application.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

Other oxymethylene polymers and methods of preparation therefor are disclosed by Sittig in Hydrocarbon Processing and Petroleum Refiner, 41(11), pp. 131–170 (November 1962) and by Kern et al. in Angewandte Chemie 73(6), pp. 177–186 (Mar. 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride, and ethylenically unsaturated compounds such as styrene, vinyl methyl ketone and acrolein.

As used in the specification and claims of the instant application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962, now abandoned, in the names of W. E. Heinz and F. B. McAndrew, which is also commonly assigned.

Oxymethylene polymers, suitable for use in this invention also include oxymethylene homopolymers, such as those made from trioxane or formaldehyde. In certain instances it may be desirable to "end-cap" the polymer molecules by such methods as esterification or etherification in order to increase their thermal stability.

The preferred polymers which are treated in accordance with this invention are thermoplastic materials having a melting point of at least 150° C. and are normally millable at a temperature of about 200° C. They have an average molecular weight of at least 10,000. These polymers have a high thermal stability before the treatment disclosed herein, however, this stability is markedly improved by such treatment. For example, if a sample of the polymer which has been treated in accordance with this invention, and which has also been chemically stabilized as described below, is placed in an open vessel in a circulating air oven at a temperature of about 230° C., and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one, when measured at 60° C. in an 0.1 weight percent solution in p-chlorophenol containing 2 weight percent of α-pinene.

In a preferred embodiment of this invention it is generally desirable to incorporate one or more thermal stabilizes into the copolymer in order to bring its thermal degradation rate even lower. The proportion of stabilizer incorporated depends upon the specific stabilizer used. A proportion between about 0.05 and 10 weight percent, based on the weight of the polymer, has been found suitable for most stabilizers.

One suitable stabilizer system is a combination of (1) an antioxidant ingredient, such as phenolic antioxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2-alkyl substitutents on each benzene ring, each alkyl substituent having from 1 to 4 carbon atoms. The preferred alkylene bisphenols are 2,2′-methylene bis-(4-methyl-6-tertiary butyl phenol) and 4,4′-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds, and aliphatic acylureas.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, when in finely divided dry state, may be blended into finely divided polymer in any suitable blending apparatus.

One suitable method of incorporation of the chemical stabilizers is by blending a dry solid stabilizer into the plastic polymer, while the latter is being kneaded on heated rolls or through an extruder.

In accordance with one embodiment of this invention, the part or article to be coated is maintained at an elevated temperature in a zone wherein finely divided particles of an oxymethylene polymer are maintained in a fluidized state with the zone-containing particles being known as a fluidized bed. A fluidized bed is a mass of solid particles which exhibits the liquid-like characteristics of mobility, hydrostatic pressure and an observable upper free surface or powdery zone across which a marked change in concentration of particles occurs. The fluidized bed may be termed "a dense phase" having an upper free surface. The fluidized bed technique is well known to those skilled in the art and is disclosed, for example, in U.S. Pats. Nos. 2,974,060 and 3,032,816.

In general, the fluidized bed is formed by introducing an ascending current of gas into the particulate coating material under pressure with the bed being maintained in the fluidized state by controlling the flow of the gas. An article to be coated is immersed at least partially into the fluidized bed of the coating material. In order to provide adhesion the article to be coated is usually heated either before or during the immersion process. The polymer particles are suitably ground to a size between about 40 to 325 mesh (420 to 44 microns), and preferably between 80 and 200 mesh (177 to 74 microns). It has been found, however, that when an article has been coated with oxymethylene polymer by the use of a fluidized bed technique or by a powder spraying process that it is frequently difficult to obtain satisfactory adherence for certain uses. Therefore, in accordance with the subject invention, the article to be coated is precoated with a base or primer material which upon partial decomposition will result in a surface suitable for adherent coating with an oxymethylene polymer.

It is believed that the precoating or priming material used partially decomposes upon heating, resulting in a residue and a decomposition product which reacts with the surface of the article to be coated to form a surface suitable for the subsequent coating treatment. In particular, it is believed the precoat decomposes into an acidic substance which has the effect of attacking the metallic surface resulting in minute surface irregularities.

Also, however, there appear to be additional effects which permit a very adherent chemical bonding to take place between the base or pre-coating material and the article surface. Suitable base material include those containing nitrocellulose, cellulose acetate, polyvinyl acetate and polyvinyl chloride. It is believed that these materials, upon heating, with or without further reaction with an additional material, liberate an acidic substance which reacts further with the article surface. For example, it is believed that nitrocellulose, upon decomposition, liberates oxides of nitrogen or nitric acid, while cellulose acetate or polyvinyl acetate liberate acetic acid. Polyvinyl chloride liberates hydrochloric acid under similar circumstances. Other decomposable materials which liberate these or other acids are suitable.

The decomposable material may be applied in a wide variety of suitable vehicles and solvents. Suitable solvents include materials such as ethyl alcohol, isopropyl alcohol, n-propyl alcohol, n-butyl alcohol, ethyl acetate, methyl ethyl ketone, methyl isobutyl ketone, toluene, xylene and mixtures thereof. In addition to the solvent, the precoating material may include certain pigments such as titanium dioxide, carbon, iron oxide and mixtures thereof. In addition to the thermally decomposable material, the precoating material may also include an additional substance which has the effect of reducing the temperature at which the decomposition of the thermally decomposable material takes place. For example, a substance such as tris-β-chloroethylphosphate may be included. It is believed that such a compound would be readily decomposed and generate hydrochloric acid at a comparatively low temperature which, in turn, would assist in decomposing the thermally decomposable material. This additional substance, which assists in the decomposition of the thermally decomposable material, may be referred to as a catalyst.

In some instances it may be desirable to include additional materials in the base or precoating material which have the effect of assisting in the decomposition of the aforementioned catalyst. On some occasions it may be desirable to have the portion of the base material including the thermally decomposable material, the catalyst and the pigments and the aforementioned solvents prepared separately as a first solution. Then the material which assists in decomposing the catalyst may be mixed with a suitable solvent to form a second solution. The two solutions are then mixed together a comparatively short time before application. Suitable solvents for the second solution include ethyl alcohol, n-butyl alcohol, isopropyl alcohol, ethyl acetate, isopropyl acetate, methyl ethyl ketone, methy isobutyl ketone, n-butyl acetate, 2-methyl-pentanon-4, benzene, toluene, p-xylene, m-xylene, o-xylene and mixtures thereof. The material which assists in the decomposition of the catalyst may include a mineral acid such as nitric acid or an organic acid such as acetic acid, or mixtures of mineral and organic acids. Also it may be desirable to include a fire retardant such as an organoborate having the formula $(RO)_3B$, wherein R is an alkyl group having up to 10 carbon atoms. Specific suitable organoborates include tri-n-butyl borate, triethyl borate and tripropyl borate.

On occasion it may also be desirable to incorporate a conductive powder in the base or primer material to provide a conductive residue after partial decomposition.

The base or precoating material may be applied to the article to be coated by any suitable method such as spraying, painting or dipping. Then the precoated article is heated to a temperature between about 200° F. and 475° F. preferably between about 350° F. and 450° F. The period of time during which the article is exposed to the above temperatures can vary between 180 mins. and 5 mins. and, within the preferred temperature range of between 350° F. and 450° F., the time preferably varies between about 30 minutes and 5 minutes. During the baking period the thermally decomposable compound contained in the precoating material decomposes and acts upon the surface of the polymer to provide a surface upon which adherent fluidized bed or other coatings may be applied.

In a preferred embodiment of this invention the precoating or priming material is applied to a thickness such that, after partial decomposition, the residue layer has a thickness between about $1 \times 10^{-4}$ inch and about $4 \times 10^{-3}$ inch.

For best results the article or object to be coated is maintained during at least part of the immersion or other coating step at a temperature above the crystalline melting point of the oxymethylene polymer particles. The fluidized particles are of course maintained at a lower temperature so that the particles remain in solid state. The object may be heated during immersion in the fluidized bed by suitable methods such as interior circulation of a heating fluid, induction heating, and like procedures. Also, of course, the object or article may preheated to a desired temperature above the melting point of the polymer particles prior to immersion therein. The temperature of the preheated article will depend upon the melting point of the polymer particles, the geometry of the parts to be coated, the thermal conductivity of the polymer and the thickness of the coating desired.

The mass of the article to be coated relative to the area of its surface is an important factor since an article with a high mass-to-surface ratio will generally cool more slowly in the fluidized bed and thereby permit a longer coating period. Generally, temperatures from just above the melting point to about 175° F. above the melting point are suitable. For oxymethylene copolymers having about 1 to 5 weight percent oxyethylene units, a preferred temperature range is about 350° F. to about 500° F. The crystalline melting point of certain of these copolymers is about 325° F.

When the article has been suitably preheated in an oven prior to immersion or other coating procedures, oxymethylene coatings varying in thickness between about 1 and about 30 mils may be obtained during a single immersion. To improve the gloss and to reduce the porosity of the coating it may be desirable to reheat the article after coating to a temperature in the same range as the preheated temperature. This reheating insures that the surface particles are fused and permits the material to flow into an even coat. If desired, the article may then be re-immersed in the fluidized bed or otherwise again coated to build up the thickness of the coating. It is found that repeated immersions may be used to increase the coating thickness to 200 mils or above. After sufficient thickness is obtained, the coated parts are permitted to cool to room temperature, or if desired they may be quenched in water to solidify the oxymethylene polymer coating.

Objects which may be coated by this technique include metallic articles such as aluminum; aluminum alloys such as aluminum alloyed with 5 to 12% silicon, nickel, magnesium, tin, chromium, titaniums; steels such as low and high carbon steels and other alloys with iron including chromium, molybdenum, silica, manganese and titanium; and other metallic materials such as brass, bronze, copper, zinc, magnesium and iron. In addition to metallic articles, other bases which may be satisfactorily coated include certain non-metallic material such as glass, ceramic and plastic bases, such as thermosetting resins of the phenolic, urea and melamine type. However, all materials should be able to withstand the temperatures necessary in order to form the satisfactory oxymethylene polymer coatings. Thus, the article to be coated must have a melting point above that of the polymer used in the coatings.

Unless stated otherwise in the following examples oxymethylene polymers were used which were prepared by polymerizing trioxane and ethylene oxide, which polymers contain approximately 2 weight percent of randomly distributed oxyethylene groups in the oxymethylene chains. The polymers had been stabilized prior to molding by hydrolytic degradation of their unstable polymer ends and by the incorporation of approximately 0.1 weight percent of a suitable scission inhibitor such as cyanoguanidine, benzoguanidine, melamine or N,N',N''-tri-n-propyl-melamine, and 0.5% of a suitable phenolic stabilizer such as 2,2'-methylene-bis(4-methyl-6-tertiary butyl phenol) or 2,2'-methylene-bis(4-ethyl-6-tertiary butyl phenol).

Also, unless otherwise mentioned, the precoating or priming material comprised a first solution made up of a vehicle and solids. The solids included titanium dioxide and carbon as pigments, nitrocellulose as the thermally decomposable material, and tris-α-chloroethyl phosphate as the catalyst. The first solution had a composition substantially as follows:

TABLE I

| Vehicle: | Percent |
|---|---|
| Ethanol | 9.6 |
| Isopropanol | 2.7 |
| Ethyl acetate | 0.4 |
| Methyl ethyl ketone | 2.6 |
| N-propanol | 1.5 |
| N-butanol | 3.2 |
| Methyl isobutyl ketone | 13.0 |
| Toluene | 3.7 |
| Xylene | 0.5 |
| Total vehicle | 37.2 |

| Solids: | |
|---|---|
| $TiO_2$ | 20.0 |
| Carbon | 2.0 |
| Nithrocellulose | 5.0 |
| Tris-β-chloroethyl phosphate | 36.0 |
| Total solids | 63.0 |

The second solution was made up of nitric acid as the mineral acid, acetic acid as the organic acid, and tri-n-butyl borate as the fire retardant in the solvent set forth in Table II.

TABLE II

| Vehicle: | Percent |
|---|---|
| Ethanol | 0.70 |
| Isopropanol | 3.3 |
| Methyl ethyl ketone | 5.2 |
| n-Propanol | 0.24 |
| n-Butanol | 3.5 |
| Methyl isobutyl ketone | 28.0 |
| Toluene | 50.5 |
| m-Xylene | 0.07 |
| 2-ml-pentanol-4 | 0.18 |
| Total vehicle | 91.69 |
| Tri-n-butyl borate | 4.96 |
| Nitric acid | 1.8 |
| Acetic acid | 1.4 |

Another suitable second solution is set forth in Table III.

TABLE III

| Vehicle: | Percent |
|---|---|
| Isopropanol | 0.78 |
| Ethyl acetate | 0.46 |
| Isopropyl acetate | 37.3 |
| Benzene | 0.68 |
| n-Propanol | 0.71 |
| n-Butanol | 3.2 |
| Methyl isobutyl ketone | 3.9 |
| Toluene | 24.6 |
| N-butylacetate | 5.8 |
| p-Xylene | 2.3 |
| m-Xylene | 9.9 |
| o-Xylene | 2.0 |
| Total vehicle | 91.63 |
| Tri-n-butyl borate | 4.3 |
| Nitric acid | 1.9 |
| Acetic acid | 2.8 |

Normally two parts of the first solution are mixed with one part of the second solution, however, the ratio may vary between about 1 and 4 parts of the first solution to about one part of the second solution. The vehicle in the first solution may vary between about 20% and 60% by weight and the solids in the first solution may vary between about 80% and 40% by weight. The thermally decomposable material in the first solution may vary between about 1% and 50% and the catalyst may vary between about 5% and 75%. The amount of mineral acid may vary between about 0.5% and 75% and the amount of organic acid may vary between about 0.5% and 75%.

EXAMPLE I

An article made of a commercially available cold rolled steel strap, measuring 1¼ x 2½ x ⅛ was sprayed with a mixture made of two parts of the first solution as set forth in Table II. The thickness of the base or precoating material, which was applied by brush, was approximately $2 \times 10^{-4}$ inch. The base coated material was heated in an oven at about 180° C. for about one hour. The article was then heated for ten minutes in an oven at a temperature of about 425° F. A fluidized bed, having particles of approximately 80 mesh size, was prepared using air at room temperature as the gaseous medium. The precoated heated articles were immersed in the fluidized bed for a period of approximately 10 seconds and upon withdrawal were found to have a coating of 9.7 mils thickness. The coated article was post-heated at 425° F. for five minutes.

It was found that such an oxymethylene copolymer coating could withstand a voltage greater than 6,000 volts, that it could be heated for 72 hours in boiling water without failing, that a 1 lb. ball dropped from a height of 4 ft. did not damage the coating, and that the coating could withstand a continuous temperature of over 230° F. without failure. In addition, an 18 gauge copper wire was passed over the thin edge of the coated article and was weighted with a 5 lb. weight. The wire did not cut through to the metal after a week's time at room temperature. Also, the wire did not cut through to the metal until a temperature about 300° F. was obtained. Thus it can be seen that these coatings have very satisfactory adherence and also are quite satisfactory upon exposure to a variety of severe conditions. In general, these coatings have proved to have excellent solvent resistance, high surface hardness and gloss, a low coefficient of friction, high heat resistance, uniform properties over a broad temperature range, excellent mechanical properties, good corrosion resistance, and high static endurance.

EXAMPLE II

An article made of 2024T4 aluminum having a rectangular shape and measuring 1 x ¼ x 2½ was sprayed with a mixture made up of two parts of a first material which included nitrocellulose, titanium dioxide, and tris-β-chloroethyl phosphate and one part of a second material, which includes toluene, methyl isobutyl ketone, nitric acid and acetic acid. The preocated article was heated in an oven at about 180° C. for about one hour. The article was then heated for ten minutes in an oven at a temperature of about 400° F. A fluidized bed, having particles of approximately 105 to 200 mesh size was prepared using air at room temperature as the gaseous medium. The heated articles were immersed in the fluidized bed for a period of approximately 10 seconds and upon withdrawal were found to have a coating of about 10 mils in thickness. After immersing, the part was post-treated at 400° F. for 5 minutes.

Other examples are set forth in Table IV as follows:

TABLE IV

Preheat 10 minutes at defined temperature. Post heat 10 minutes to smooth coating by visual observation.

| Ex. | Oven temp., °F. Preheat | Oven temp., °F. Postheat | Immersion time, sec. | Coating thickness, mils | No. immersions | Material coated |
|---|---|---|---|---|---|---|
| 1 | 355 | 350 | 10 | 7.5 | 1 | (¹) |
| 2 | 390 | 390 | 10 | 10.0 | 1 | (¹) |
| 3 | 460 | ³ 460 | 15 | 18.0 | 1 | (¹) |
| 4 | 400 | 400 | 10 | 15 | 2 | (²) |

¹ Cold rolled steel.
² Steel.
³ 2 minutes.

EXAMPLE III

As was earlier stated, a metallic or non-metallic part, after precoating, may also have the oxymethylene polymer applied thereto by a powder spraying process, rather than by the fluidized bed technique.

An article of the same type described in Example II above was sprayed with the same precoating mixture, and was then preheated at about 425° F. for approximately 10 minutes. One side of the article was sprayed with oxymethylene copolymer powder of about 105 to 200 mesh, was heated a second time in an oven at 425° F. for 10 minutes, and the opposite side thereof was sprayed with the same copolymer powder. The article was post-heated for 10 minutes at about 425° F., and it was noted that the coating thickness was about 11 mils.

All of the above examples passed the tests set forth in Example I.

It is to be understood that the foregoing detailed description is given merely by way of illustration and that many variations may be made therein without departing from the spirit of our invention.

The embodiments of the invention in which an exclusive property or privilege is claimed are defined as follows:

1. A method of coating an article with an oxymethylene polymer which comprises applying a primer material to a surface of said article, said primer material being one which upon partial decomposition liberates an acidic substance selected from the group consisting of oxides of nitrogen, nitric acid, acetic acid and hydrochloric acid and renders said surface receptive to a tightly adherent coating of said polymer, partially decomposing said primer material by heating the primed article at a temperature between about 200° F. and 475° F. for between about 5 minutes and 180 minutes to form said acidic substance, the lower temperatures corresponding to the longer times and the higher temperatures to the shorter times, and contacting the heated primed article with said polymer in particulate form to provide a fused coating thereon said article having a melting point above that of the oxymethylene polymer with which it is coated.

2. A method of coating an article with an oxymethylene polymer which comprises applying a primer material to a surface of said article, said primer material being one which upon partial decomposition liberates an acidic substance selected from the group consisting of oxides of nitrogen, nitric acid, acetic acid and hydrochloric acid and renders said surface receptive to a tightly adherent coating of said polymer, partially decomposing said primer material by heating the primed article at a temperature between about 200° F. and 475° F. for between about 5 minutes and 180 minutes to form said acidic substance, the lower temperatures corresponding to the longer times and the higher temperatures to the shorter times, providing a fluidized bed of oxymethylene polymer particles, and immersing the heated primed article in said fluidized bed to provide a fused coating of oxymethylene polymer on said article, said article having a melting point above that of the oxymethylene polymer with which it is coated.

3. A coating method as described in claim 2 wherein said primer material is partially decomposed by heating the primed article at a temperature between about 350° F. and 450° F. for between about 5 minutes and 30 minutes, the lower temperatures corresponding to the longer times and the higher temperatures to the shorter times.

4. A method of coating an article with an oxymethylene copolymer, said copolymer having a melting point above about 150° C. and having at least one chain containing recurring oxymethylene units interspersed with —OR— groups in the main polymer chain, where R is a divalent radical containing at least two carbon atoms directly linked to each other and positioned in the chain between the two valences, with any substituents on said R radical being inert, which comprises applying to said article a primer material selected from the group consisting of nitrocellulose, cellulose acetate, polyvinyl acetate and polyvinyl chloride, said primer material being one which upon partial decomposition liberates an acidic substance and renders the surface of said article receptive to a tightly adherent coating of said copolymer, partially decomposing said primer material by heating the primed article at a temperature between about 350° F. and 450° F. for between about 5 minutes and 30 minutes to form said acidic substance, the lower temperatures corresponding to the longer times and the higher temperatures to the shorter times, providing a fluidized bed of particles of said oxymethylene copolymer, said particles being between 40 mesh and 325 mesh, and immersing the heated primed article, which is at a temperature above the crystalline melting point of said oxymethylene copolymer, said crystalline melting point being between about 350° F. and about 500° F., in said fluidized bed to provide a fused coating of oxymethylene copolymer on said article, said article having a melting point above that of the oxymethylene polymer with which it is coated.

5. A coating method as defined in claim 2, in which said article is at an elevated temperature for at least a portion of said immersing step.

6. A coating method as defined in claim 5, in which said elevated temperature is above the crystalline melting point of said polymer.

7. A coating method as defined in claim 5, in which said elevated temperature is between about 350° F. and about 500° F.

8. A coating method as defined in claim 2, in which the particles of polymer are between 40 mesh and 325 mesh.

9. A coating method as defined in claim 2, in which the oxymethylene polymer coating on the article has a thickness between about .001 and about .200 inch.

10. A coating method as defined in claim 2, in which subsequent to said immersing step said article is removed from said fluidized bed, and said article is again immersed in said fluidized bed to increase the thickness of the coating of oxymethylene polymer.

11. A coating method as defined in claim 10, in which said article is heated to an elevated temperature between said removal and said second immersion steps.

12. A coating method as defined in claim 1, in which the oxymethylene copolymer has a melting point above about 150° C. with the copolymer having at least one chain containing recurring oxymethylene units interspersed with —OR— groups in the main polymer chain, where R is a divalent radical containing at least two carbon atoms directly linked to each other and positioned in the chain between the two valences, with any substituents on said R radical being inert.

13. A coated article as produced by the process of claim 1.

14. A coated article as defined in claim 13, wherein the partially decomposed primer has a thickness between about $1 \times 10^{-4}$ inch and about $4 \times 10^{-3}$ inch.

15. A coated article as defined in claim 13, wherein said oxymethylene polymer coating has a thickness between about .001 and about .200 inch.

References Cited

UNITED STATES PATENTS

| | | | |
|---|---|---|---|
| 2,775,570 | 12/1956 | Barkdoll et al. | 117—161L |
| 2,844,489 | 7/1958 | Gemmer | 117—21X |
| 2,974,059 | 3/1961 | Gemmer | 117—21X |
| 3,008,848 | 11/1961 | Annonio | 117—21 |
| 3,016,875 | 1/1962 | Ballentine et al. | 117—21X |
| 3,019,126 | 1/1962 | Bartholomew | 117—21X |
| 3,027,352 | 3/1962 | Walling et al. | 260—67EP |
| 3,106,769 | 10/1963 | Goethe et al. | 117—21X |
| 3,122,525 | 2/1964 | Kern et al. | 260—67EP |
| 3,136,651 | 6/1964 | Spessard | 117—21X |
| 3,194,675 | 7/1965 | Carter et al. | 117—33 |
| 3,214,403 | 10/1965 | Peerman | 117—21X |
| 3,264,131 | 8/1966 | Nagel | 117—21X |

FOREIGN PATENTS

| | | | |
|---|---|---|---|
| 900,149 | 7/1962 | Great Britain | 117—21 |

WILLIAM D. MARTIN, Primary Examiner

P. F. ATTAGUILE, Assistant Examiner

U.S. Cl. X.R.

117—33, 161; 148—6; 260—67